United States Patent
Kostański et al.

(10) Patent No.: US 12,234,918 B2
(45) Date of Patent: Feb. 25, 2025

(54) WATER DELIVERY VALVE ASSEMBLY

(71) Applicant: Goodrich Corporation, Charlotte, NC (US)

(72) Inventors: Piotr Kostański, Iwiny (PL); Piotr Zając, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 181 days.

(21) Appl. No.: 17/989,076

(22) Filed: Nov. 17, 2022

(65) Prior Publication Data
US 2023/0151895 A1 May 18, 2023

(30) Foreign Application Priority Data
Nov. 18, 2021 (EP) .................... 21461621

(51) Int. Cl.
*F16K 11/07* (2006.01)
*F16K 11/074* (2006.01)
*F16K 11/22* (2006.01)
*F16K 11/24* (2006.01)
(Continued)

(52) U.S. Cl.
CPC ............ *F16K 11/074* (2013.01); *F16K 11/22* (2013.01); *F16K 11/24* (2013.01); *F16K 15/184* (2021.08); *F16K 31/041* (2013.01)

(58) Field of Classification Search
CPC ...... F16K 11/074; F16K 15/184; F16K 11/22; F16K 11/0853; F16K 27/065
See application file for complete search history.

(56) References Cited

U.S. PATENT DOCUMENTS

| | | | |
|---|---|---|---|
| 5,107,894 A | 4/1992 | Hochstrasser | |
| 7,448,553 B2 * | 11/2008 | Schmitt .............. | G05D 23/1393 236/12.21 |

(Continued)

FOREIGN PATENT DOCUMENTS

| | | |
|---|---|---|
| CN | 103842597 A | 6/2014 |
| DE | 7106330 U | 7/1971 |

(Continued)

OTHER PUBLICATIONS

Abstract CN103842597 (A), Published: Jun. 4, 2014, 1 page.
(Continued)

*Primary Examiner* — Kevin R Barss
(74) *Attorney, Agent, or Firm* — CANTOR COLBURN LLP (57) ABSTRACT

A water delivery valve assembly includes a cold water inlet and a hot water inlet and a mixed water outlet, a mixer valve assembly configured to receive water from the hot and cold water inlets in a ratio determined by a desired temperature input and to mix the hot and cold water in a mixing chamber, and a flow control valve assembly sharing a common housing with the mixer valve assembly and arranged to receive water from the mixing chamber and provide water at the desired temperature to the mixed water outlet at desired time period. The mixer valve assembly includes drive means to control the ratio, and the flow control valve includes drive means to control the flow, and the drive means of the mixer valve assembly and of the flow control valve assembly are also provided in the common housing.

19 Claims, 6 Drawing Sheets

(51) Int. Cl.
  *F16K 15/18* (2006.01)
  *F16K 31/04* (2006.01)

(56) References Cited

U.S. PATENT DOCUMENTS

| | | | | |
|---|---|---|---|---|
| 7,823,603 | B2* | 11/2010 | Cochart | F16K 15/063 |
| | | | | 251/285 |
| 8,950,730 | B2 | 2/2015 | Bedolla et al. | |
| 10,088,851 | B2* | 10/2018 | Huck | G05D 23/1313 |
| 10,274,971 | B2* | 4/2019 | Song | G06F 17/11 |
| 10,860,041 | B2* | 12/2020 | Lange | E03C 1/041 |
| 10,900,577 | B2 | 1/2021 | Christenson | |
| 2003/0218074 | A1 | 11/2003 | Beck et al. | |
| 2004/0000594 | A1* | 1/2004 | Beck | G05D 23/1346 |
| | | | | 236/12.15 |
| 2005/0258258 | A1* | 11/2005 | Jonte | G05D 23/1346 |
| | | | | 236/12.15 |
| 2014/0182691 | A1* | 7/2014 | James | G05D 23/19 |
| | | | | 236/12.14 |
| 2023/0151895 | A1* | 5/2023 | Kostanski | F16K 11/22 |
| | | | | 137/468 |

FOREIGN PATENT DOCUMENTS

| | | |
|---|---|---|
| DE | 102007010792 A1 | 9/2008 |
| GB | 2075831 A | 11/1981 |

OTHER PUBLICATIONS

Abstract for DE102007010792 (A1), Published: Sep. 4, 2008, 1 page.

European Search Report for Application No. 21461621.1, mailed Jun. 2, 2022, 8 pages.

* cited by examiner

WATER DELIVERY VALVE ASSEMBLY

CROSS-REFERENCE TO RELATED APPLICATIONS

This application claims priority to European Patent Application No. 21461621.1 filed Nov. 18, 2021, the entire contents of which is incorporated herein by reference.

TECHNICAL FIELD

The present disclosure relates to water flow control systems, particularly an assembly for controlling the temperature and flow of water from a water supply system e.g. for a faucet. The assembly can be used, for example, for the wash basin in an aircraft lavatory or the like, but may also be used in other applications where the temperature and flow of water is to be controlled.

BACKGROUND

It is often required to provide water at a given temperature and when required, via e.g. a faucet. One example is at a faucet at a sink or wash basin, where water from hot and cold water sources is mixed, using a mixer valve, according to the desired temperature, to provide warm water from the faucet. A shut-off valve turns the flow on or off as required. Conventional hot and cold mixing faucets may use mechanical means such as levers or knobs to control the relative flow of water from the hot and cold water sources to be mixed, to control the overall water temperature. More recently, touchless controls have been developed, where an electronically controlled valve regulates the flow from the hot and cold sources to be mixed in response to a command signal e.g. from a proximity sensor or the like. Some electrically driven mixing valves operate on the idea of two solenoid flow control valves for each hot and cold inlet, feeding the outlet with the correct water mixture by appropriate opening cycle time ratio. This kind of solution, however, raises a concern of power consumption and RF compatibility. In some faucet systems, the overall water temperature is set and cannot be adjusted by the user. Various types of mixer valve are known and readily available.

A shut-off, or flow control valve can permit or prevent the flow of mixed warm water.

Conventionally, the water faucet itself is a simple water outlet spout and other components of the overall system are responsible for mixing the hot and cold water to the desired temperature (the mixer valve and its controls).

Each of the mixer valve and the flow control valve are provided in a housing and are provided with their control and drive systems and inlet/outlet ports in various parts of the overall water system. The mixer valve, for example, may be located under the sink or wash basin and the flow regulator in the neck of the faucet but other arrangements are, of course, also possible.

This distributed arrangement of the valve system parts, however, requires there to be sufficient space for the different valve housings and control systems and also requires time and expertise to assemble, maintain and, where required, dismantle the various parts of the assembly. In some applications such space and/or time is not readily available. An example is in the lavatory of an aircraft where space is very limited and where down time for maintenance should be kept to a minimum.

There is, therefore, a need for a more compact assembly for regulating the temperature and flow of the delivery of water.

SUMMARY

According to the present disclosure, there is provided a water delivery valve assembly comprising a cold water inlet and a hot water inlet and a mixed water outlet, the assembly further comprising a mixer valve assembly configured to receive water from the hot and cold water inlets in a ratio determined by a desired temperature input and to mix the hot and cold water in a mixing chamber, and further comprising a flow control valve assembly sharing a common housing with the mixer valve assembly and arranged to receive water from the mixing chamber and provide water at the desired temperature to the mixed water outlet at desired time period, and wherein the mixer valve assembly includes drive means to control the ratio, and the flow control valve includes drive means to control the flow toggle on or off, and wherein the drive means of the mixer valve assembly and of the flow control valve assembly are also provided in the common housing.

Features of some embodiments are set out in the dependent claims.

BRIEF DESCRIPTION

Examples of the assembly according to this disclosure will be described with reference to the drawings. These are examples only and it is to be noted that alternative embodiments and variations are possible within the scope of the claims.

DETAILED DESCRIPTION

An example of an assembly according to this disclosure will be described in detail with reference to the drawings.

The assembly has a cold water inlet 1, a hot water inlet 2 and a mixed water outlet 3. The cold water inlet is arranged to be connected to a cold water supply (not shown) and the hot water inlet 2 is arranged to be connected to a hot water supply (not shown). Hot and cold water inlets and the manners in which they can be connected to respective hot and cold water supplies are well-known in the art and will not be described further. The shape, size and positioning of the inlets shown here are one example only, and other configurations will be known to those skilled in the art. A mixed water outlet 3 is provided via which water of the desired temperature, obtained by mixing water from the hot and cold inlets, is provided to output water to the faucet (not shown). The mixed water outlet 3 is connected to a faucet or other output in any known manner and, again, this will not be described further. Again, the orientation, size, shape and other configuration of the mixed water outlet 3 can be varied as required by any given application of the valve assembly.

The valve assembly includes a mixer valve assembly 10 and a flow control valve assembly 20 provided in a single unit 100 and share a common housing 30. The mechanics of the valve assemblies are mounted to a manifold 60 mounted on the face of the housing 30 and are in fluid communication with the hot and cold inlets and the mixed water outlet. The controls for the valve assemblies (described further below) are located within the housing 30. An electrical connector 40 extends from outside the housing, for connection to a power supply (not shown) into the housing for connection with the controls for the valve assemblies in the housing so that power can be supplied to the valve assembly controls.

Figure 1A:
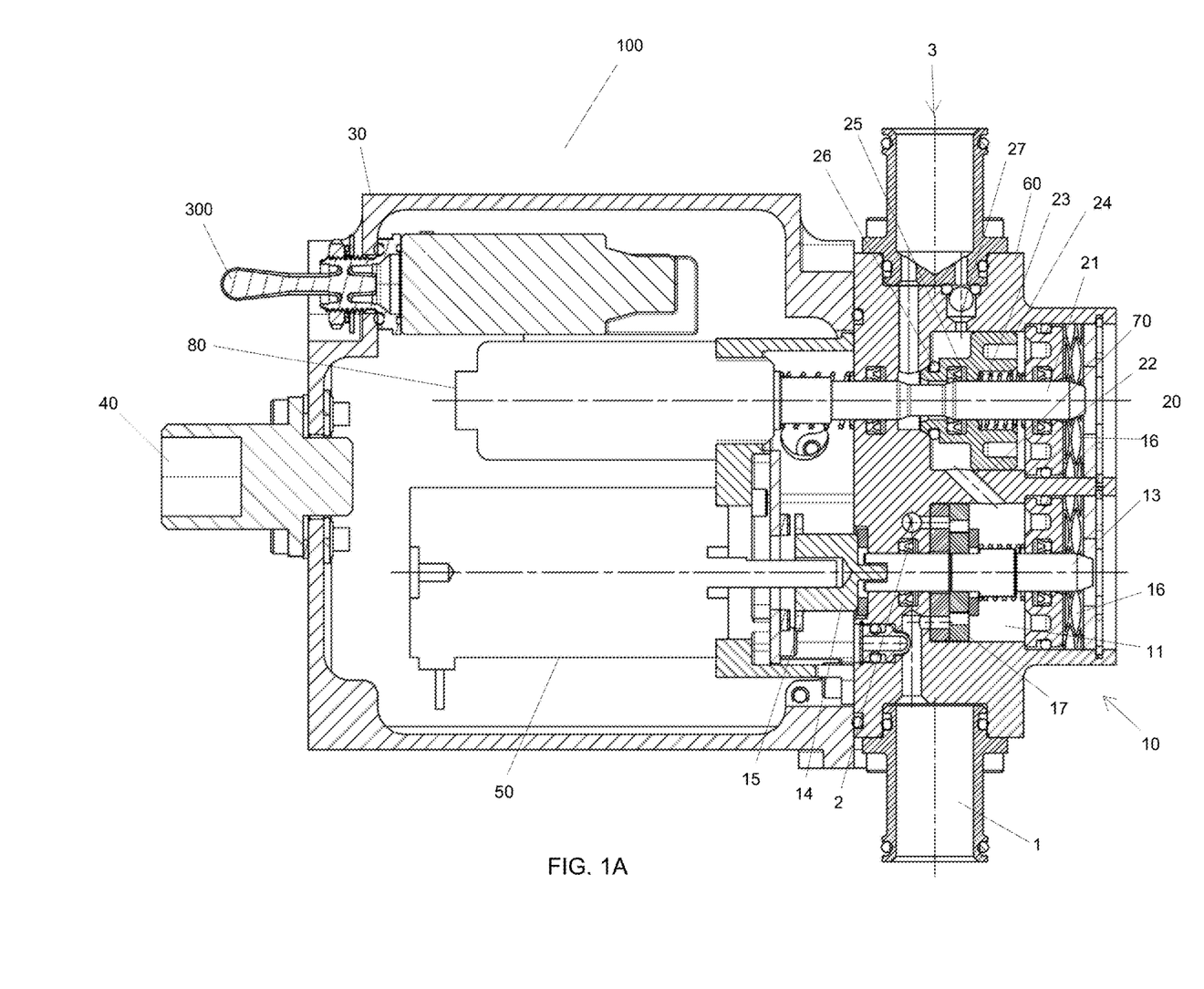
FIG. 1A is a side sectional view of an assembly according to this disclosure.
Figure 1B:
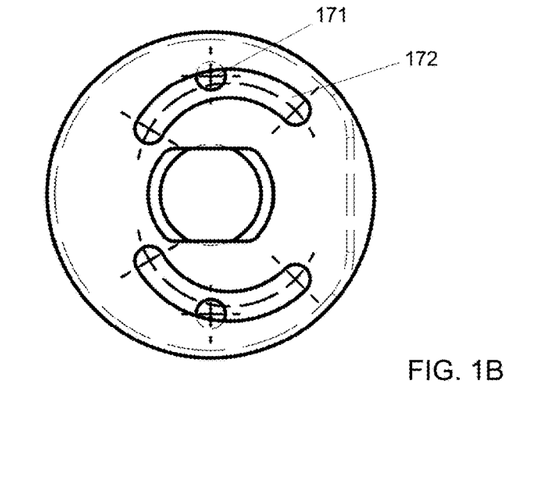
FIG. 1B is a detailed view of an example of a mixer valve arrangement.
Figure 2:
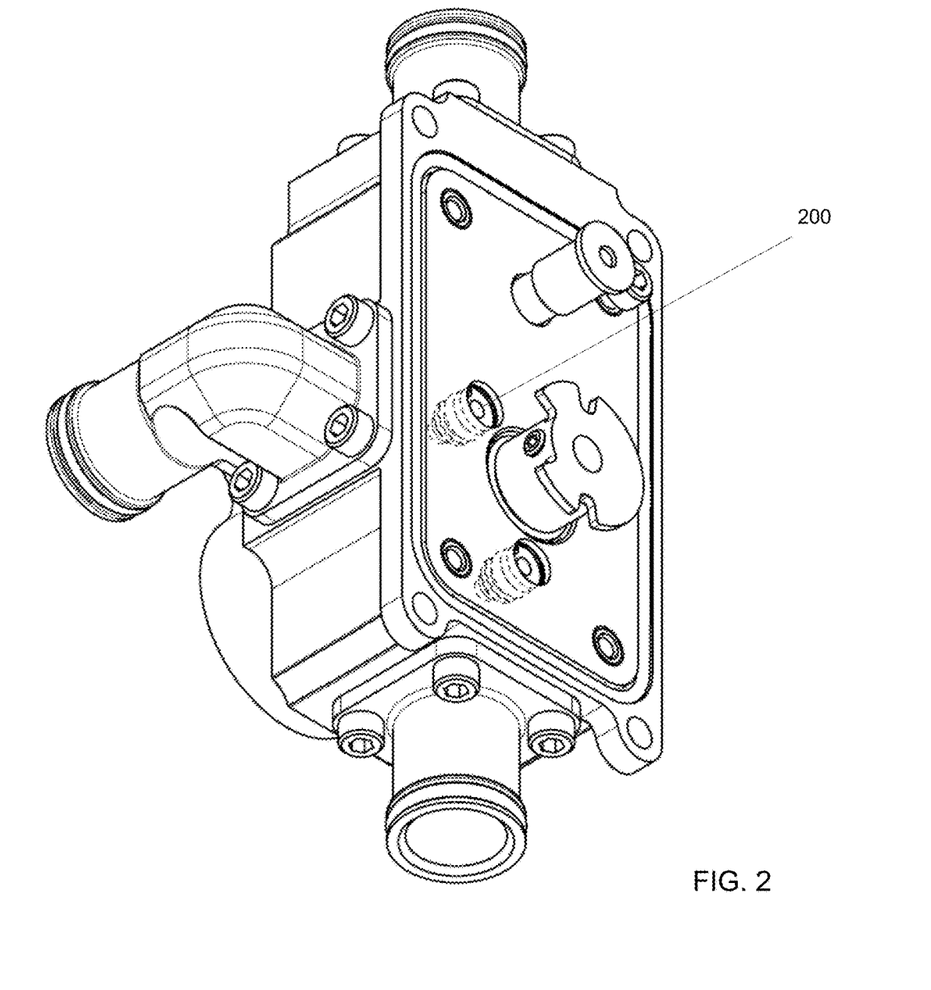
FIG. 2 shows a partial exposed view of the assembly of FIG. 1.
Figure 3:
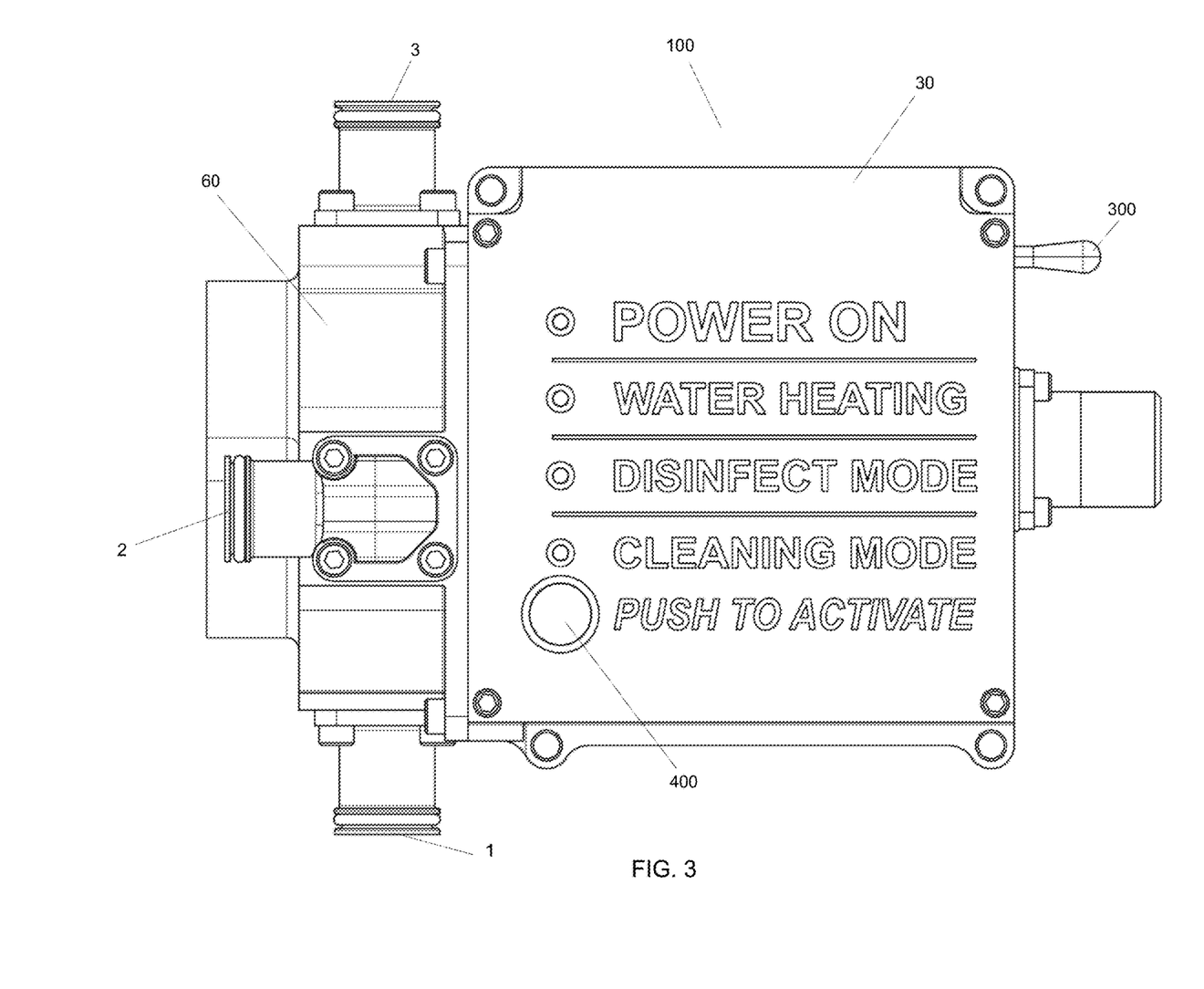
FIG. 3 shows a side view of an assembly according to the disclosure.
Figure 4:
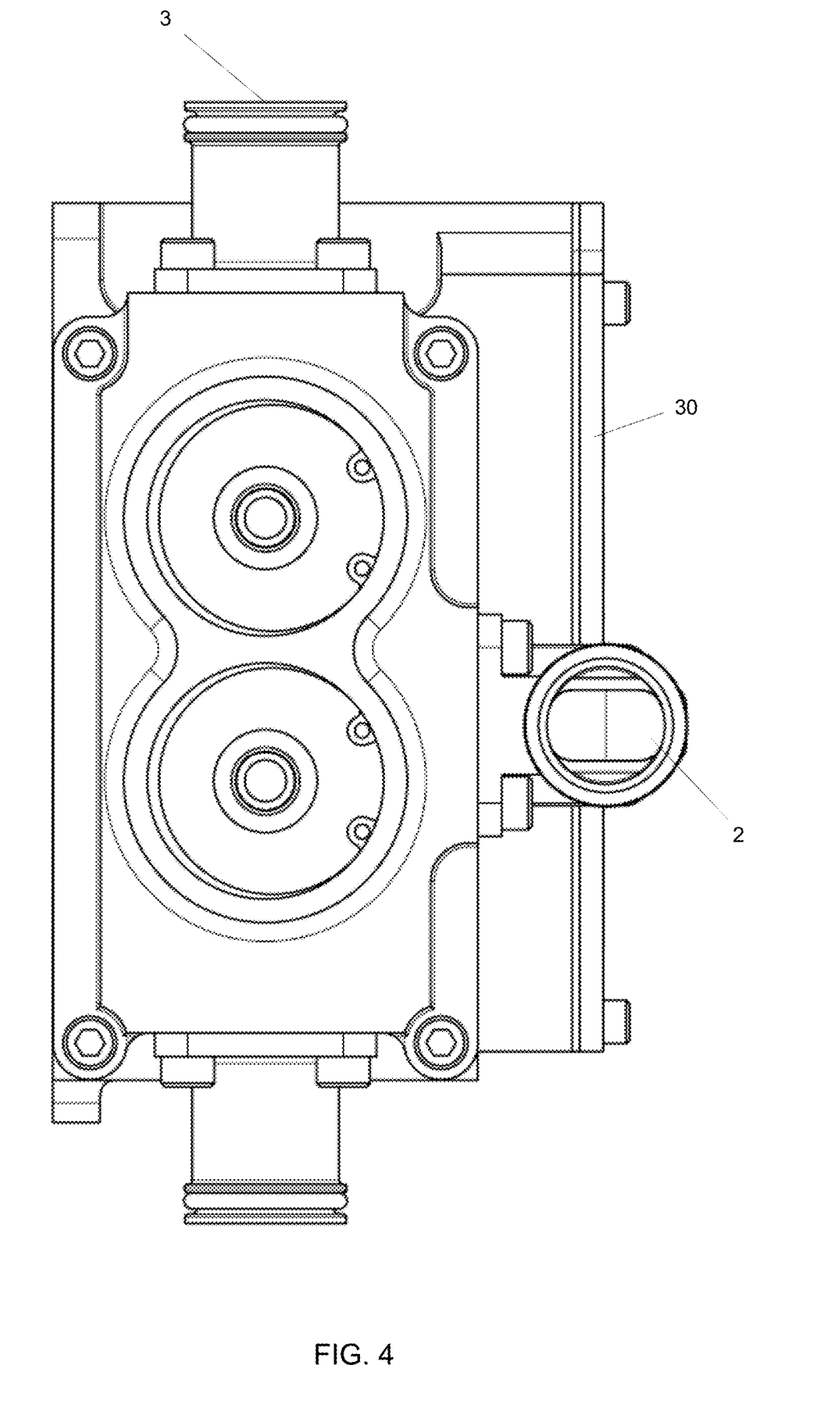
FIG. 4 shows an end view of the assembly of FIG. 3.
Figure 5:
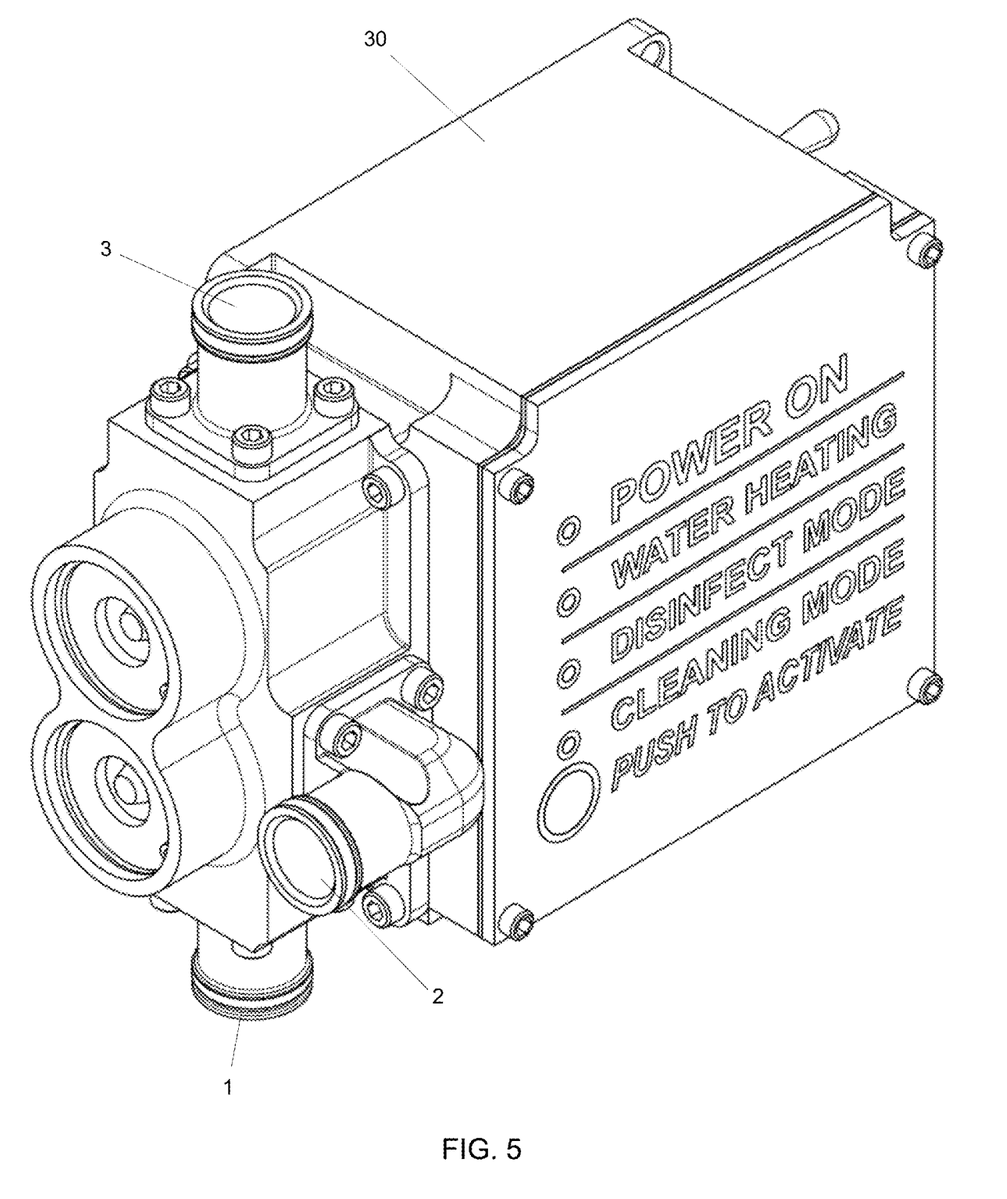
FIG. 5 shows a front isometric view of an assembly according to the disclosure.
Figure 6:
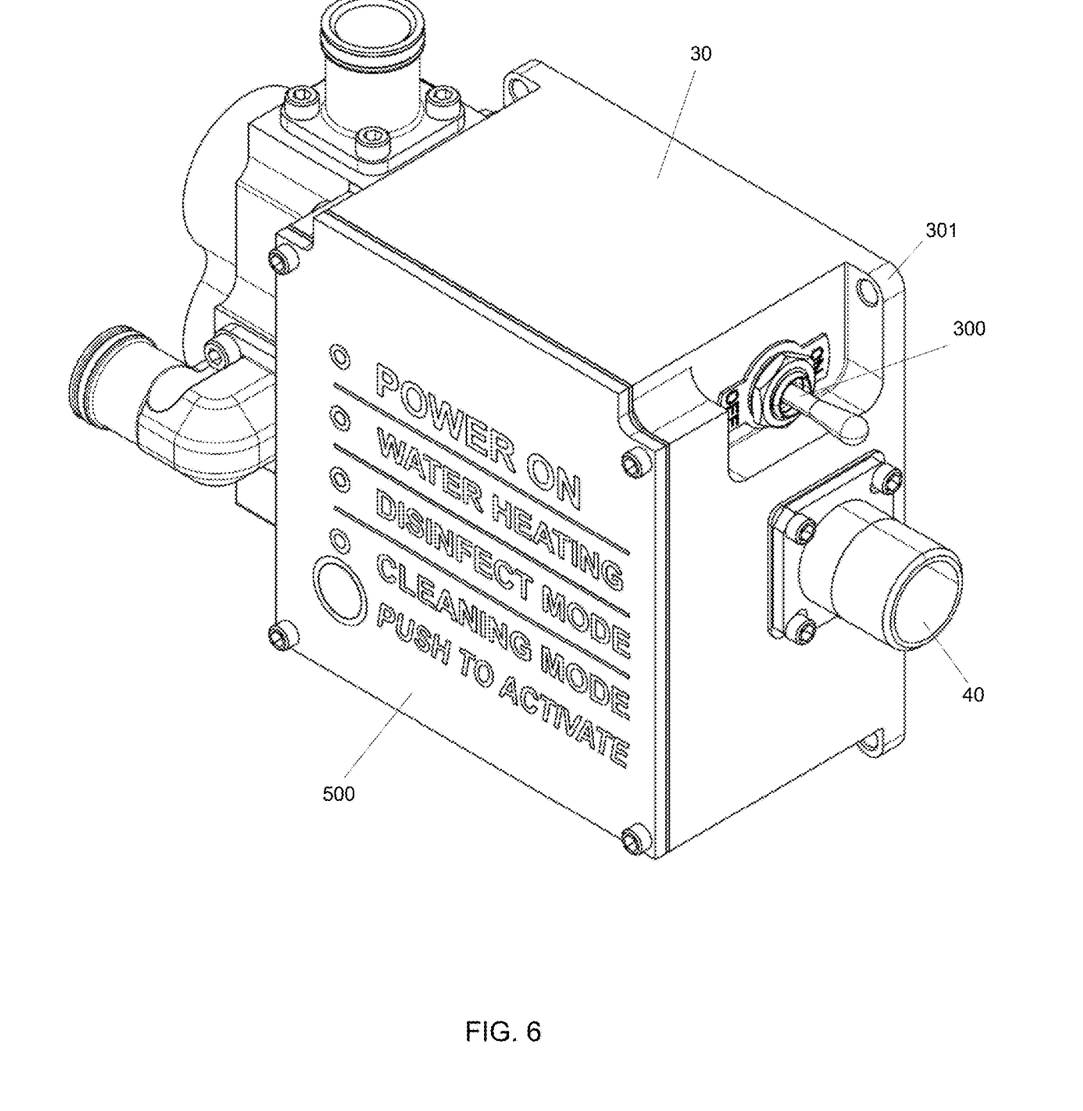
FIG. 6 shows a rear isometric view of the assembly of FIG. 5.

The mixer valve assembly 10 is in fluid communication with the cold water inlet 1 and the hot water inlet 2 and is configured to mix hot and cold water in appropriate proportions to achieve the desired water temperature to be output from the assembly to e.g. a faucet. The mechanism of the mixing valve assembly 10 can be similar to any known mixing valve mechanism whereby relative flows from the hot and cold water inlets are controlled by a moveable member according to an input command. In the example shown, a valve member is moved to allow varying ratios of hot and cold water to flow from the inlets 1, 2 to a mixing chamber 11 by means of an electric motor 50 driven by an electrical control signal input by a user indicative of the desired water temperature. In an example, the moveable valve member may be a moveable disc 17 that is rotated relative to the hot and cold water inlets by means of a shaft 13 that is driven by the motor 50. Here, the shaft is connected to the motor by means of an adaptor 14 but this will depend on the design of the shaft and motor. In other variations, the moveable member could be controlled manually by operation of switches, levers or the like. To ensure the rotation of the shaft provides the desired angular position of the disc 17, position sensors 15 may be provided to monitor the rotation position of the shaft 13. Temperature sensors 200 may be provided to monitor the temperature of the mixed water and/or to measure the temperature of the hot and cold water from the inlets, and to control the operation of the mixer valve accordingly, in a feedback or feedforward manner. The motor in the example shown is a DC stepper motor, but other drive mechanisms or motors may also be used. Different angular positions of the moveable disc 17 give different opening areas of the hot and cold water inlets to provide different mixing ratios. The disc 17 may be a ceramic disc for improved wear resistance and, in such a design, a second, stationary disc may be provided. The housing 30 and the stationary disc would be provided with two through-holes 171 for flow from the hot and cold inlets, respectively, and the moveable disc 17 would have arcuate two slots 121. Rotation of the moveable disc causes the degree of overlap between the slots and the through-holes to vary so as to vary the flow openings for hot and cold water.

The water flowing from the hot and cold water inlets 1, 2 as regulated by the valve disc enters the mixing chamber 11 where the hot and cold water will mix to produce the desired temperature. The mixing chamber 11 can be sealed against leakage and may be provided with an insulative cap 16 to provide protection against freezing.

The mixed water then passes from the mixing chamber 11 via a conduit 70 to the flow control valve assembly 20, which is in fluid flow communication with the mixed water outlet 3 and which is configured to control the flow in the manner of a shut off valve of the mixed water, from the mixing chamber, flowing to and out of the mixed water outlet 3. Those skilled in the art will be aware of various valve designs that could be used to regulate the fluid flow. The example shown in FIG. 1 uses a pilot operated solenoid valve comprising a pilot rod 21 driven by the drive means which, in this example, is shown as a linear solenoid drive 80 and drives axial movement of the pilot rod 21 according to a flow toggle on control input. Again, however, the flow control valve could be controlled manually by operation of switches, levers or the like. Axial movement of the pilot rod 21 causes corresponding axial movement of a pilot poppet 22 in a manner known in the art to vary the flow orifice through the valve assembly between the conduit 70 and the mixed water outlet 3. The pilot orifice 23 and the pressure balancing orifice 24 are obtained by a clearance fit of the poppet in the manifold 60 and appropriate seals 25, 26 may be provided to avoid leakage. In such configuration there is no need to incorporate a diaphragm. The mixed water outlet 3 may also function as a drain and a floating check valve 27 may be provided to regulate flow through the drain. The floating check valve 27 could be also implemented for venting purpose in order to allow an air to escape the internal chambers during bleeding of the assembly with water in a passive manner, without the necessity of opening the flow control valve.

The drive means for each of the valve assemblies 10, 20 are located in the common housing 30 and may be secured relative to each other and relative to the housing by means of an adaptor 90.

An ON/OFF switch 300 may be provided to switch the entire valve assembly on/off. The switch can be equipped with a circuit breaker functionality for an additional electronics components protection.

The housing may also be provided with a command interface 500 which can enable a user to set the assembly to operate in different modes and to read the operational state of the unit. A push button, or other input can be provided so that the assembly can be set to operate in e.g. water heating mode, disinfect mode, cleaning mode etc. For example, 'POWER ON' may indicate if the power switch 300 is toggled to the ON position and electrical power is supplied through the electrical connector 40. CLEANING MODE may indicate, after pressing the button 400, that operation to mix and output water is suspended to allow the flow path surfaces to be cleaned. Other indicators on the interface 500 may include WATER HEATING to show when the water is being heated, DISINFECT to show that the valve is being flushed with disinfectant. These are just examples of indications that could be provided via such an interface.

The housing 30 is designed so that it can be mounted to an appropriate location in or near the water system/faucet as required e.g. by screws or other fasteners.

By having the mixer and flow control valve assemblies and their drives/controls all provided in a single unit, the water control is provided by means of a compact assembly that can be easily assembled/dismounted in one location wherever is most appropriate in the circumstances. The assembly uses many readily available components and the number of custom parts required is low. Most of the assembly parts can be manufactured by injection moulding and the others parts are simple to machine-manufacture. Because the flow control valve assembly pilot orifice is obtained by a clearance fit of moving parts, no diaphragm is required.

The unit is advantageous where space is limited e.g. in aircraft lavatories but can also have advantages in many other applications.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A water delivery valve assembly comprising:
    a cold water inlet;
    a hot water inlet;
    a mixed water outlet;
    a mixer valve assembly including a mixing chamber, mixer valve assembly configured to receive water from the hot and cold water inlets in a ratio determined by a desired temperature input and to mix the hot and cold water in a mixing chamber;
    a flow control valve assembly sharing a common housing with the mixer valve assembly and arranged to receive water from the mixing chamber and provide water at the desired temperature to the mixed water outlet at desired time period;
    wherein the mixer valve assembly includes drive means to control the ratio;
    wherein the flow control valve includes drive means to control the flow;
    wherein the drive means of the mixer valve assembly and of the flow control valve assembly are also provided in the common housing; and
    a floating check valve to regulate flow of water through the outlet.

2. A water delivery valve assembly as claimed in claim 1, further comprising:
    one or more temperature sensors to detect the temperature of the water in the mixing chamber and to provide a feedback signal to the drive means of the mixer valve assembly.

3. A water delivery valve assembly as claimed in claim 1, wherein the housing is provided with an interface having means for indicating one or more states of operation of the assembly.

4. A water delivery valve assembly as claimed in claim 1, comprising electronic circuitry to route and process electronic signals to control the valve drives and to communicate with external interfaces, in use.

5. A water delivery valve assembly comprising:
    a cold water inlet;
    a hot water inlet;
    a mixed water outlet;
    a mixer valve assembly including a mixing chamber, mixer valve assembly configured to receive water from the hot and cold water inlets in a ratio determined by a desired temperature input and to mix the hot and cold water in a mixing chamber;
    a flow control valve assembly sharing a common housing with the mixer valve assembly and arranged to receive water from the mixing chamber and provide water at the desired temperature to the mixed water outlet at desired time period;
    wherein the mixer valve assembly includes drive means to control the ratio;
    wherein the flow control valve includes drive means to control the flow; and
    wherein the drive means of the mixer valve assembly and of the flow control valve assembly are also provided in the common housing;
    wherein an electrical connector extends from the common housing for connection to a power supply, the electrical connector being electrically connected to the drive means of the mixer valve assembly and the flow control valve assembly.

6. A water delivery valve assembly comprising:
    a cold water inlet;
    a hot water inlet;
    a mixed water outlet;
    a mixer valve assembly including a mixing chamber, mixer valve assembly configured to receive water from the hot and cold water inlets in a ratio determined by a desired temperature input and to mix the hot and cold water in a mixing chamber;
    a flow control valve assembly sharing a common housing with the mixer valve assembly and arranged to receive water from the mixing chamber and provide water at the desired temperature to the mixed water outlet at desired time period;
    wherein the mixer valve assembly includes drive means to control the ratio;
    wherein the flow control valve includes drive means to control the flow; and
    wherein the drive means of the mixer valve assembly and of the flow control valve assembly are also provided in the common housing;
    wherein the flow control valve assembly comprises a pilot operated solenoid valve.

7. A water delivery valve assembly as claimed in claim 6, wherein the pilot operated solenoid valve comprises a pilot rod driven by a solenoid drive which causes axial movement of the pilot rod to control opening and closing of the valve by means of a pilot poppet.

8. A water delivery valve assembly as claimed in claim 7, wherein the pilot operated solenoid valve includes a pilot orifice and a pressure balancing orifice obtained by a clearance fit of the pilot poppet in the housing.

9. A water delivery valve assembly as claimed in claim 5, further comprising:
    one or more temperature sensors to detect the temperature of the water in the mixing chamber and to provide a feedback signal to the drive means of the mixer valve assembly.

10. A water delivery valve assembly as claimed in claim 5, wherein the flow control valve assembly comprises a pilot operated solenoid valve.

11. A water delivery valve assembly as claimed in claim 5, wherein the housing is provided with an interface having means for indicating one or more states of operation of the assembly.

12. A water delivery valve assembly comprising:
a cold water inlet;
a hot water inlet;
a mixed water outlet;
a mixer valve assembly including a mixing chamber, mixer valve assembly configured to receive water from the hot and cold water inlets in a ratio determined by a desired temperature input and to mix the hot and cold water in a mixing chamber;
a flow control valve assembly sharing a common housing with the mixer valve assembly and arranged to receive water from the mixing chamber and provide water at the desired temperature to the mixed water outlet at desired time period;
wherein the mixer valve assembly includes drive means to control the ratio;
wherein the flow control valve includes drive means to control the flow; and
wherein the drive means of the mixer valve assembly and of the flow control valve assembly are also provided in the common housing;
wherein the mixer valve assembly comprises:
a moveable member moveable relative to the cold water inlet and the hot water inlet such that movement of the moveable member controls relative flows from the hot and cold water inlets according to an input command.

13. A water delivery valve assembly as claimed in claim 12, wherein the moveable valve member includes a moveable disc that is rotated relative to the hot and cold water inlets by means of a shaft that is driven by the drive means of the mixer valve assembly.

14. A water delivery valve assembly as claimed in claim 13, wherein the drive means of the mixer valve assembly comprises an electric motor.

15. A water delivery valve assembly as claimed in claim 13, further comprising:
position sensors to detect the rotary position of the shaft.

16. A water delivery valve assembly as claimed in claim 12, further comprising:
one or more temperature sensors to detect the temperature of the water in the mixing chamber and to provide a feedback signal to the drive means of the mixer valve assembly.

17. A water delivery valve assembly as claimed in claim 12, wherein the flow control valve assembly comprises a pilot operated solenoid valve.

18. A water delivery valve assembly as claimed in claim 12, wherein the housing is provided with an interface having means for indicating one or more states of operation of the assembly.

19. A water delivery valve assembly as claimed in claim 1, comprising seals to prevent leakage of water in the assembly.

* * * * *